US011482227B2

(12) United States Patent
Choi

(10) Patent No.: US 11,482,227 B2
(45) Date of Patent: Oct. 25, 2022

(54) SERVER AND METHOD FOR CONTROLLING EXTERNAL DEVICE

(71) Applicant: SAMSUNG ELECTRONICS CO., LTD., Suwon-si (KR)

(72) Inventor: Dong-hyun Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/844,686

(22) Filed: Apr. 9, 2020

(65) Prior Publication Data

US 2020/0243093 A1 Jul. 30, 2020

Related U.S. Application Data

(63) Continuation of application No. 15/689,428, filed on Aug. 29, 2017, now Pat. No. 10,650,822.

(30) Foreign Application Priority Data

Sep. 7, 2016 (KR) .......................... 10-2016-0115255

(51) Int. Cl.
*G10L 15/22* (2006.01)
*G10L 15/26* (2006.01)
(Continued)

(52) U.S. Cl.
CPC .............. *G10L 15/26* (2013.01); *G10L 15/22* (2013.01); *G10L 15/30* (2013.01);
(Continued)

(58) Field of Classification Search
None
See application file for complete search history.

(56) References Cited

U.S. PATENT DOCUMENTS 6,654,720 B1 11/2003 Graham
6,988,070 B2 1/2006 Kawasaki et al.
(Continued)

FOREIGN PATENT DOCUMENTS

CN 1342290 A 3/2002
CN 104583927 A 4/2015
(Continued)

OTHER PUBLICATIONS

International Search Report and Written Opinion, issued by International Searching Authority in corresponding International Application No. PCT/KR2017/009143, dated Dec. 11, 2017, (PCT/ISA/220, PCT/ISA/210 & PCT/ISA/237).‡
(Continued)

*Primary Examiner* — Richard Z Zhu
(74) *Attorney, Agent, or Firm* — Sughrue Mion, PLLC

(57) ABSTRACT

A server controlling an external device is provided. The server includes a communicator; a processor; a memory which stores at least one natural language understanding (NLU) engine for generating a command corresponding to a user's utterance. The server receives, from a pairing device paired to the external device, the user's utterance controlling the external device and information about at least one external device registered with the pairing device, via the communicator, determines an NLU engine corresponding to the external device, from among the at least one NLU engine, based on the user's utterance controlling the external device and the information about the at least one external device, and generates the command controlling the external device based on the user's utterance, by using the determined NLU engine.

18 Claims, 14 Drawing Sheets

(51) Int. Cl.
    *H04L 12/28*     (2006.01)
    *G10L 15/30*     (2013.01)
    *G10L 15/18*     (2013.01)
    *G10L 15/32*     (2013.01)
    *G06F 3/16*     (2006.01)
    *H04M 1/72415*     (2021.01)

(52) U.S. Cl.
    CPC ...... *H04L 12/2807* (2013.01); *H04L 12/2818* (2013.01); *H04L 12/2825* (2013.01); *G06F 3/167* (2013.01); *G10L 15/18* (2013.01); *G10L 15/32* (2013.01); *G10L 2015/223* (2013.01); *G10L 2015/228* (2013.01); *H04L 12/282* (2013.01); *H04L 12/2814* (2013.01); *H04L 12/2816* (2013.01); *H04M 1/72415* (2021.01)

(56) References Cited

U.S. PATENT DOCUMENTS

| | | | |
|---|---|---|---|
| 7,886,033 B2 * | 2/2011 | Hopmann | H04L 41/0893 709/224 |
| 7,934,014 B2 * | 4/2011 | Ishida | H04L 12/4633 709/238 |
| 9,390,716 B2 | 7/2016 | Nakano et al. | |
| 9,690,542 B2 | 6/2017 | Reddy et al. | |
| 9,761,241 B2 | 9/2017 | Maes et al. | |
| 9,967,728 B2 * | 5/2018 | Logue | G08B 25/001 |
| 9,984,686 B1 | 5/2018 | Mutagi | |
| 9,990,176 B1 | 6/2018 | Gray | |
| 10,026,401 B1 * | 7/2018 | Mutagi | G06F 3/167 |
| 10,127,906 B1 * | 11/2018 | Mutagi | G10L 15/22 |
| 10,127,908 B1 | 11/2018 | Deller | |
| 10,185,544 B1 | 1/2019 | Mutagi | |
| 10,397,013 B1 * | 8/2019 | Hill | H04L 67/306 |
| 10,453,461 B1 * | 10/2019 | Mutagi | H04L 12/2816 |
| 10,976,996 B1 * | 4/2021 | Mutagi | G10L 15/22 |
| 2005/0128048 A1 * | 6/2005 | Krzyzanowski | H04N 21/64753 340/13.24 |
| 2005/0187767 A1 * | 8/2005 | Godden | G10L 15/08 704/238 |
| 2006/0009980 A1 | 1/2006 | Burke et al. | |
| 2009/0265217 A1 * | 10/2009 | Aurenz | H04N 21/42204 713/168 |
| 2013/0262093 A1 ‡ | 10/2013 | Balchandran | G06F 40/295 704/9 |
| 2014/0095152 A1 ‡ | 4/2014 | Kim | G06F 40/40 704/9 |
| 2014/0172953 A1 | 6/2014 | Blanksteen | |
| 2014/0249821 A1 ‡ | 9/2014 | Kennewick | G10L 15/1822 704/25 |
| 2014/0288932 A1 | 9/2014 | Yeracaris et al. | |
| 2014/0379334 A1 | 12/2014 | Fry | |
| 2015/0088518 A1 | 3/2015 | Kim | |
| 2015/0149176 A1 * | 5/2015 | Giulianelli | G06F 40/30 704/257 |
| 2015/0154976 A1 * | 6/2015 | Mutagi | H04L 12/281 704/275 |
| 2015/0356057 A1 | 12/2015 | Subramanian et al. | |
| 2016/0080165 A1 ‡ | 3/2016 | Ehsani | H04L 12/282 704/9 |
| 2016/0098393 A1 ‡ | 4/2016 | Hebert | G06F 40/40 704/9 |
| 2016/0125881 A1 | 5/2016 | Vogel | |

FOREIGN PATENT DOCUMENTS

| | | | |
|---|---|---|---|
| CN | 107515944 A | | 12/2017 |
| GB | 2 367 399 A | | 4/2002 |
| JP | 2001-319045 A | | 11/2001 |
| JP | 2018-509014 A | | 3/2018 |
| KR | 10-2004-0075646 A | ‡ | 8/2004 |
| KR | 10-2004-0075646 A | | 8/2004 |
| WO | 2014/171144 A1 | | 10/2014 |

OTHER PUBLICATIONS

Communication dated Apr. 23, 2019 issued by the European Intellectual Property Office in counterpart European Application No. 17849002.5.
Communication dated Jul. 26, 2021 issued by the Japanese Patent Office in application No. 2019-534617 Fnnshtion.
Communication dated Feb. 8, 2022, issued by the INDIA Intellectual Property Office in Indian Patent Application No. 201947006267.
Communication dated Aug. 30, 2022 by the Chinese Intellectual Property Office in Chinese Application No. 201710804249.1.

\* cited by examiner
‡ imported from a related application

SERVER AND METHOD FOR CONTROLLING EXTERNAL DEVICE

CROSS-REFERENCE TO RELATED APPLICATION

This application is a Continuation Application of U.S. application Ser. No. 15/689,428, filed on Aug. 29, 2017, which claims priority from Korean Patent Application No. 10-2016-0115255, filed on Sep. 7, 2016, in the Korean Intellectual Property Office, the disclosure of which is incorporated herein in by reference in its entirety.

BACKGROUND

1. Field

An apparatus and a method consistent with exemplary embodiments broadly relates to a server for controlling an external device, and an operating method thereof, and more particularly, to a server for controlling an external device based on a user's utterance and an operating method thereof.

2. Description of the Related Art

With the development of internet of things (IoT) technologies, users are able to control, via electronic devices, IoT devices providing various services. In particular, as users have been able to control the IoT devices by speaking commands, the IoT devices around the users may be easily controlled by the users.

Manufacturers of the IoT devices may be different from manufacturers of the electronic devices for controlling the IoT devices. Thus, the manufacturers of the electronic devices for controlling the IoT devices pre-set functions for controlling the IoT devices based on users' utterances and the manufacturers of the IoT devices additionally operate servers for controlling the IoT devices in order to implement the predetermined functions. In this case, the IoT devices are not directly controlled by the electronic devices. Rather, signals for controlling the IoT devices, the signals being generated by the electronic devices, may pass through servers operated by the manufacturers of the electronic devices and then may control the IoT devices via the additional servers for controlling the IoT devices.

In this case, the manufacturers of the IoT devices have to additionally operate the servers. In addition, the manufacturers of the IoT devices are limited with respect to applying additional functions to the IoT devices other than the pre-determined functions for controlling the IoT devices. Also, in most cases, it is impossible for the manufacturers of the IoT devices to expand user utterance sentences corresponding to the functions of controlling the IoT devices.

Meanwhile, when a user is to control an IoT device by using an electronic device, the user has to register the IoT device and link the IoT device to an identification (ID) of the electronic device. Here, a manufacturer of the IoT device manufactures and sells an additional IoT hub so that the IoT device may be conveniently controlled by one electronic device.

Accordingly, whenever users buy an IoT device, the users have to buy an additional IoT hub corresponding to the IoT device, and sometimes the users have to connect his/her IoT device to an electronic device via a website, etc. by himself/herself.

SUMMARY

According to an aspect of an exemplary embodiment, a server and a method are provided to remove a burden of a manufacturer of an internet of things (IoT) device having to operate an additional server to provide a function for controlling the IoT device.

According to yet another aspect of an exemplary embodiment, a server and a method are provided whereby manufacturers of IoT devices may register functions for controlling the IoT devices without restraint.

According to yet another aspect of an exemplary embodiment, a server and a method are provided whereby a device for controlling an IoT device may operate also as an additional IoT hub corresponding to the IoT device so that a user does not have to connect his/her IoT device to an electronic device via a website, etc., by himself/herself, even if the user does not buy an additional IoT hub.

Additional aspects of an exemplary embodiment will be set forth in part in the description which follows and, in part, will be apparent from the description, or may be learned by practice of exemplary embodiments.

According to an aspect of an exemplary embodiment, a server controlling an external device includes: a communicator; a memory configured to store at least one natural language understanding (NLU) engine for generating a command corresponding to a user's utterance; and a processor which receives, via the communicator, from a pairing device paired with the external device, the user's utterance controlling the external device and information about at least one external device registered with the pairing device, determines an NLU engine corresponding to the external device, from among the at least one NLU engine, based on the user's utterance controlling the external device and the information about the at least one external device, and generates the command for controlling the external device based on the user's utterance, by using the determined NLU engine.

The at least one NLU engine may vary based on at least one of a manufacturer of the external device and a type of the external device. That is, the at least one NLU engine may include a plurality of NLU engines which are different from each other based on the manufacturer of the respective external device and/or a type of the respective external device.

The NLU engine may be determined by extracting a portion of a call sign of the external device and a portion of a phrase of a service call of the external device from the user's utterance controlling the external device, and determining the NLU engine corresponding to the portion of the call sign of the external device, from among the at least one NLU engine, based on the portion of the call sign of the external device and the information about the at least one external device.

The command controlling the external device may be generated by generating an NLU result corresponding to the extracted portion of the phrase of the service call of the external device, by using the determined NLU engine, and by generating the command controlling the external device, based on the NLU result.

The generating the command controlling the external device may further include generating a natural language corresponding to the command controlling the external device, based on the NLU result.

The information about the at least one external device may include an identification (ID) of the at least one external device, an ID of a manufacturer of the at least one external device, and at least one call sign of the at least one external device.

The at least one call sign of the at least one external device may be determined based on a user input via the pairing device.

When the external device is paired with the pairing device via near-field communication; the processor may transmit via the communicator, to the pairing device, an ID of the external device and the generated command controlling the external device.

When the external device is paired with the pairing device via telecommunication, the processor may further transmit, via the communicator, to the external device, the generated command controlling the external device.

An ID of the external device may be provided by the pairing device.

According to an aspect of another exemplary embodiment, a control method of controlling an external device, includes: storing at least one natural language understanding (NLU) engine for generating a command corresponding to a users utterance; receiving, from a pairing device paired with the external device, the user's utterance controlling the external device and information about at least one external device registered to the pairing device; determining an NLU engine corresponding to the external device, from among the at least one NLU engine, based on the users utterance controlling the external device and the information about the at least one external device; and generating the command controlling the external device based on the user's utterance, by using the determined NLU engine.

BRIEF DESCRIPTION OF THE DRAWINGS

These and/or other aspects will become more apparent and more readily appreciated from the following description of exemplary embodiments, taken in conjunction with the accompanying drawings. Understanding that these drawings depict only exemplary embodiments and are not therefore to be considered to be limiting of the scope of the disclosure, the principles herein are described and explained with additional specificity and detail through the use of the accompanying drawings, in which.

DETAILED DESCRIPTION OF EXEMPLARY EMBODIMENTS

Figure 1:
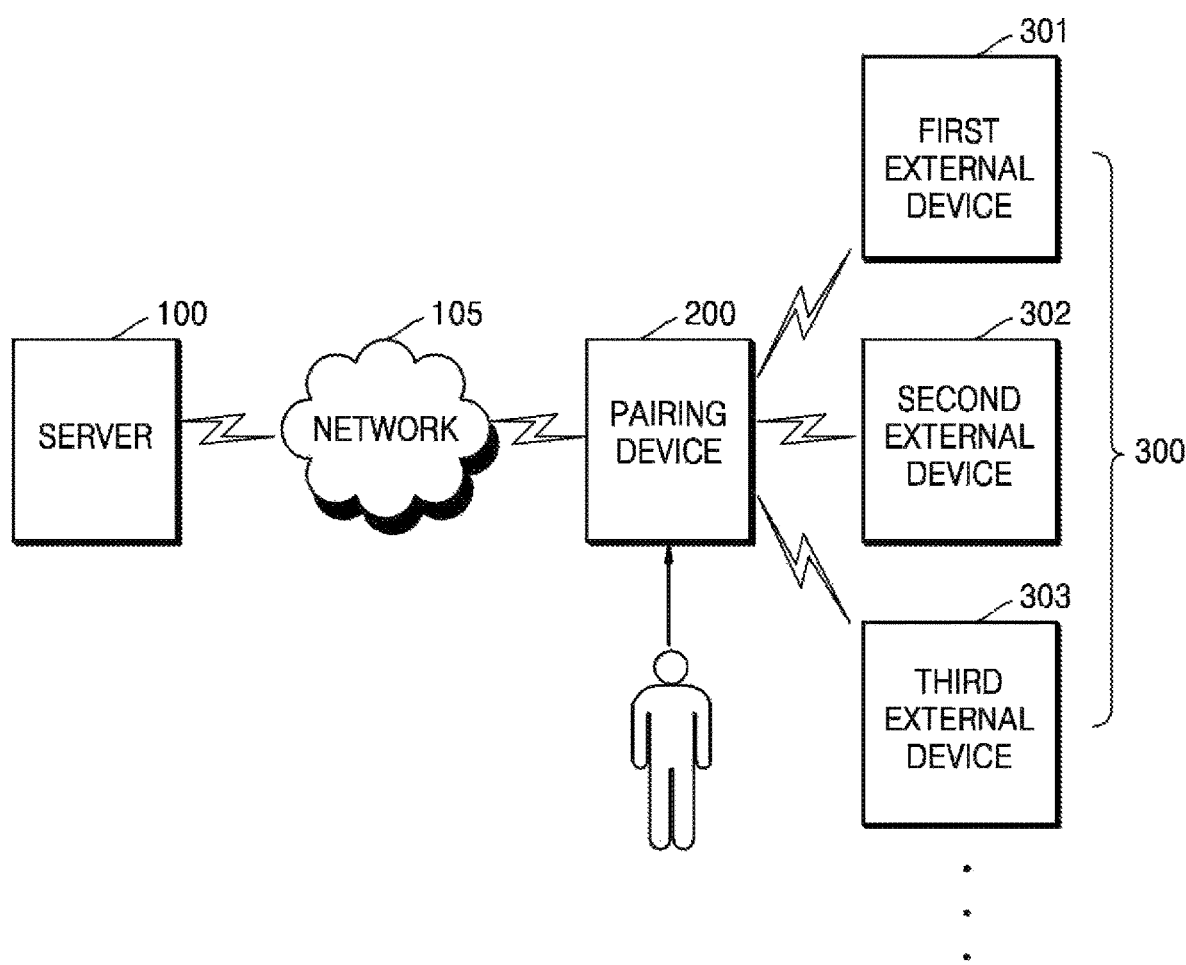
FIG. 1 is a view illustrating a system for controlling an external device based on a user's utterance, according to an exemplary embodiment.

Hereinafter, example embodiments will be described in detail with reference to the accompanying drawings. Also, a method of constructing and using an electronic device, according to exemplary embodiments, will be described in detail with reference to the accompanying drawings. Like reference numerals or signs in the drawings refer to analogous elements or components performing substantially the same functions. Expressions such as "at least one of," when preceding a list of elements, modify the entire list of elements and do not modify the individual elements of the list.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments. As used herein, the term "and/or," includes any and all combinations of one or more of the associated listed items.

The terminology used herein is for the purpose of describing exemplary embodiments only and is not intended to be limiting of exemplary embodiments. As used herein, the singular forms "a, n," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

FIG. 1 is a view illustrating a system for controlling an external device based on a user's utterance, according to an exemplary embodiment.

A server 100 may be a server device which may be wirelessly or via wires connected with a pairing device 200 through a network 105 and may operate in order to control the external device 300 based on a user's utterance.

The server 100 may store a natural language understanding (NLU) engine corresponding to the external device 300. The server 100 may be configured to control the external device(s) 300 by analyzing a user's utterance by using the NLU engine. The NLU engine may be provided by a manufacturer of the external device(s) 300. Also, the NLU engine may be updated by the manufacturer of the external device(s) 300.

The network 105 may be a comprehensive data communications network through which the server 100 and the pairing device 200 may smoothly communicate with each other, and may include wired internet, wireless internet, and a mobile wireless communications network.

The pairing device 200 may be a device configured to receive a user's utterance, transmit the received user's utterance to the server 100, and control the external device paired to the pairing device 200 based on data received from the server 100.

The pairing device 200 may be wirelessly or via wires connected to the server 100 through the network 105. Also, the pairing device 200 may be paired to the external device(s) 300 wirelessly. The pairing device 200 may receive the user's utterance for controlling the external device(s) 300.

When the pairing device 200 is initially paired to the external device(s) 300, the pairing device 200 may receive and store information of the external device(s) 300. The information of the external device(s) 300 may include an identifier (ID) of the external device(s) 300, an ID of the manufacturer of the external device(s) 300, and at least one call sign of the external device(s) 300.

The pairing device 200 may include, for example, a smartphone, a tablet personal computer (PC), a PC, a smart television (TV), or other mobile or non-mobile computing devices, but is not limited thereto. Also, the pairing device 200 may be a wearable device having a communication function and a data processing function, such as a watch, glasses, a hair band, a ring, etc., but is not limited thereto. The pairing device 200 may include all types of devices which are configured to be paired to the external device(s) 300 and to receive, from the server 100, signals for controlling the external device(s) 300 through the network 105. FIG. 1 illustrates that a first external device 301, a second external device 302, and a third external device 303 are paired to the pairing device 200. However, the number of external devices 300 paired to the pairing device 200 is not limited.

The external device(s) 300 may include electronic devices or Internet of things IoT devices which are to be controlled via a user's utterance.

The external device(s) 300 may include, for example, electronic devices used in households, such as lamps, refrigerators, closed circuit televisions (CCTVs), TVs, laundry machines, air conditioners, dehumidifiers, etc., or automobiles. The external device(s) 300 may include all types of devices configured to be wirelessly paired to the pairing device 200 through the network 105 and to transmit and receive signals to and from the pairing device 200.

The external device(s) 300 may include a plurality of external devices including the first external device 301, the second external device 302, and the third external device 303. Hereinafter, it is assumed that the external device 300 includes at least one external device.

The server 100 may be connected to the external device(s) 300 via the pairing device 200, or the server 100 may be configured to be directly connected to the external device(s) 300 wirelessly, and to control the external device(s) 300.

Figure 2:
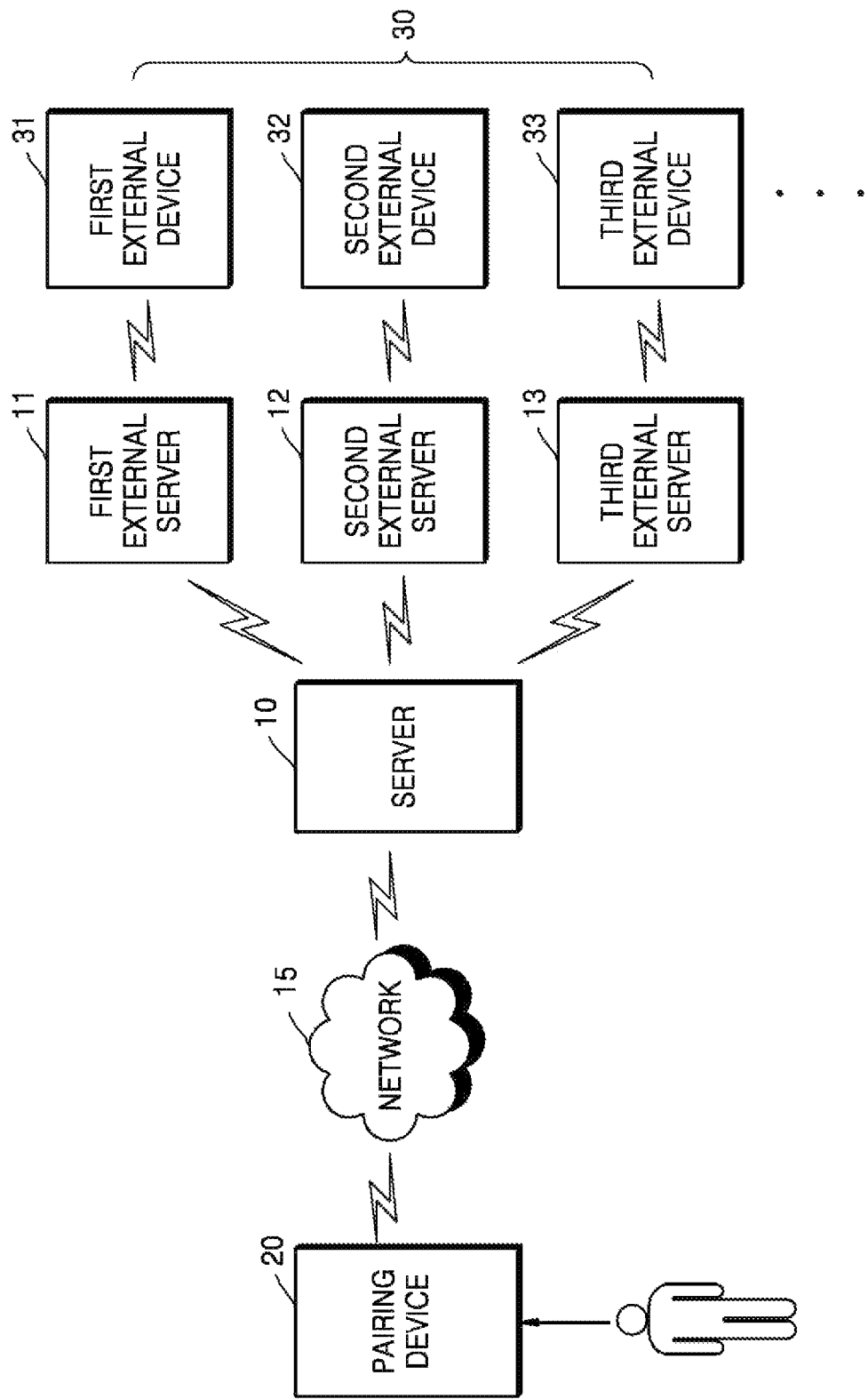
FIG. 2 is a view illustrating a system for controlling an external device based on a user's utterance, according to another exemplary embodiment.

FIG. 2 is a view illustrating a system for controlling an external device based on a user's utterance, according to another exemplary embodiment.

A pairing device 20 illustrated in FIG. 2 may be wirelessly or via wires connected to a server 10 through a network 105, Also, the pairing device 20 may receive a user's utterance.

The server 10 may receive the user's utterance from the pairing device 20. The server 10 may analyze the user's utterance with respect to a function designated by a manufacturer of the pairing device 20, by using an NLU engine.

The server 10 may store the NLU engine for analyzing the user's utterance. The NLU engine may be provided by the manufacturer of the pairing device 20.

The server 10 may be connected to first through third external device servers 11, 12, and 13 corresponding to the external device(s) 30, based on the user's utterance. Meanwhile, the external device(s) 30 includes the first through third external devices 31, 32, and 33.

The server 10 may control the external device(s) 30 via the first through third external device servers 11, 12, and 13 based on the user's utterance.

The first through third external device servers 11, 12, and 13 may be servers operated by a manufacturer of the external device(s) 30.

In detail, according to an exemplary embodiment, the server 10 may be connected to the first external device server 11 operated by a manufacturer of a first external device 31, connected to the second external device server 12 operated by a manufacturer of a second external device 32, and connected to the third external device server 13 operated by a manufacturer of a third external device 33.

According to an exemplary embodiment of the system illustrated in FIG. 2, the server 10 may analyze the user's utterance only with respect to functions designated by the manufacturer of the pairing device 20. Thus, there was a limit for the external device(s) 30 to additionally implement a function which is not designated by the manufacturer of the pairing device 20. Also, in order for the server 10 to control the external device(s) 30, the first through third external device servers 11, 12, and 13 are additionally needed. Thus, the manufacturer of the external device(s) 30 has a burden to additionally operate the first through third external device servers 11, 12, and 13. Also, a user has to perform an inconvenient operation of pre-registering, to the server 10, and pairing the identification information of the external device(s) 30 to the pairing device 20.

Hereinafter, the server 100 and the pairing device 200 for solving the above inconveniences of the system illustrated in FIG. 2 will be described in detail, according to an exemplary embodiment.

Figure 3:
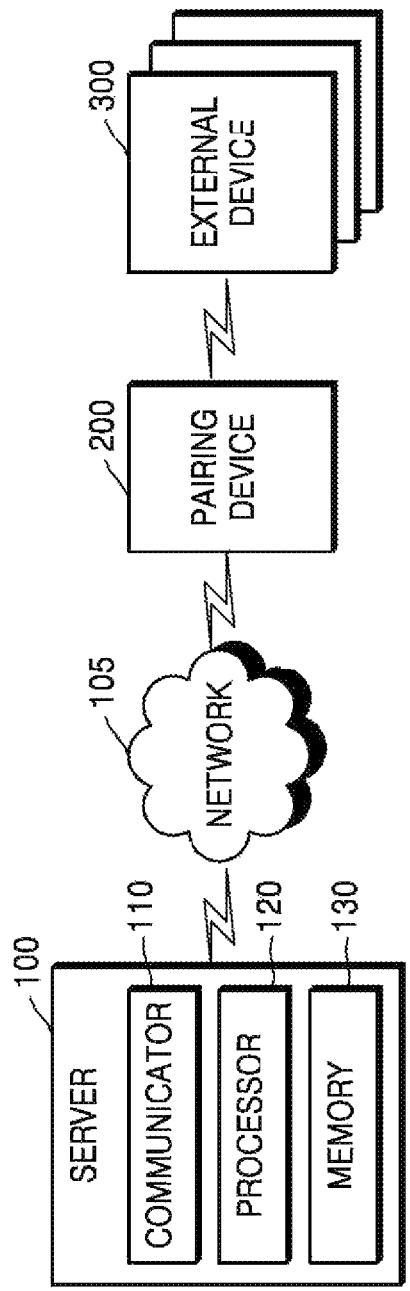
FIG. 3 is a view illustrating a structure of a server, according to an exemplary embodiment.

FIG. 3 is a view illustrating a structure of the server 100 according to an exemplary embodiment.

Referring to FIG. 3, the server 100 according to an exemplary embodiment may include a communicator 110, a processor 120, and a memory 130.

The communicator 110 may transmit and receive data or signals to and from the pairing device 200 through the network 105 under control of the processor 120.

The network 105 may include one or more components which enable communications based on, for example, a local area network (LAN), a wide area network (WAN), a value added network (VAN), a mobile radio communications network, a satellite communications network, or a combination thereof. Also, the communicator 110 may directly and wirelessly transmit and receive data or signals to and from the external device 300 by using a WLAN (WiFi), etc.

The communicator 110 may receive, from the pairing device 200 paired to the external device 300, a user's utterance for controlling the external device 300 and information of at least one external device registered to the pairing device 200, under control of the processor 120.

The information of at least one external device may include, for example, an ID of an external device, an ID of a manufacturer of the external device, and at least one call sign of the external device. The information of at least one external device may include information of the external device 300 which may be paired to the pairing device 200.

The ID of the external device 300 may be an ID given to the external device 300 by the pairing device 200, when the external device 300 is initially paired to the pairing device 200.

The ID of the manufacturer of the external device may be an ID differently given to each manufacturer.

The at least one call sign of the external device may be a name of the external device, which is to be included in a user's utterance to call the external device. Each external device may include at least one call sign. The at least one call sign of the external device may be determined by a user input via the pairing device 200. Also, when there is no call sign received from the user input via the pairing device 200, the at least one call sign may be predetermined by the manufacturer of the external device.

The processor 120 according to an exemplary embodiment may execute one or more programs stored to the memory 130. The processor 120 may include a single-core processor, a dual-core processor, a triple-core processor, a quadruple-core processor, and a multi-core processor. Also, the processor 120 may include a plurality of processors.

The processor 120 according to an exemplary embodiment may control the external device such that an NLU engine corresponding to the external device 300 is determined from at least one NLU engine, based on the user's utterance for controlling the external device 300 and the information of at least one external device.

For example, the processor 120 may control the external device such that a portion of a call sign of the external device 300 and a portion of a phrase of a service call of the external device 300 are extracted from the user's utterance for controlling the external device 300. The portion of the call sign of the external device 300 refers to a portion of the user's utterance, the portion including only the call sign of the external device 300. The portion of the phrase of the service call of the external device 300 refers to a portion of the user's utterance, the portion including the sentence for controlling the external device 300. The portion of the phrase of the service call of the external device 300 may be a portion of the user's utterance, the portion excluding only the portion of the call sign of the external device 300.

Also, the processor 120 may control the external device such that at least one NLU engine corresponding to the portion of the call sign of the external device 300 is determined from the at least one NLU engine, based on the portion of the call sign of the external device 300 and the information of at least one external device.

For example, when the portion of the call sign of the external device 300 corresponds to a plurality of external devices, the processor 120 may determine a plurality of NLU engines corresponding to the call sign of the external device 300, based on the information of at least one external device.

The processor 120 according to an exemplary embodiment may control the external device such that a command for controlling the external device 300 based on a user's utterance is generated, by using the determined NLU engine.

For example, the processor 120 may control the external device such that an NLU result corresponding to the extracted portion of the phrase of the service call of the external device 300 is generated, by using the NLU engine.

Also, the processor 120 may control the external device such that the command for controlling the external device 300 is generated, based on the NLU result.

For example, a program including instructions for generating the command for controlling the external device 300 based on the NLU result may be stored in the memory 130 or may be additionally stored in an external server (not shown). In the latter case, the processor 120 may transmit the NLU result to the external server and receive a command generated by the external server.

Also, the processor 120 may generate a natural language corresponding to the command for controlling the external device 300 based on the NLU result. The natural language corresponding to the command for controlling the external device 300 may be transmitted to the pairing device 200 and may be output via sound via an audio output unit (not shown) of the pairing device 200.

The memory 130 according to an exemplary embodiment may store various data, programs, and applications for driving and controlling the server 100. The programs stored in the memory 130 may include one or more instructions. The programs (the one or more instructions) and the applications stored to the memory 130 may be executed by the processor 120.

Also, the memory 130 may store the at least one NLU engine for generating the command corresponding to the user's utterance.

The at least one NLU engine may vary based on at least one of the manufacturer of the external device 300 and a type of the external device 300. The type of the external device 300 may vary according to a product group of the external device 300, a product name of the external device 300, a type of a service provided by the external device 300, etc.

The NLU engine stored to the memory 130 may be updated via the communicator 110 by the manufacturer of the external device 303. For example, the manufacturer of the external device 300 may update the NLU engine such that the NLU engine further includes an instruction for generating a command corresponding to a portion of a phrase of a service call of a new external device 300.

Figure 4:
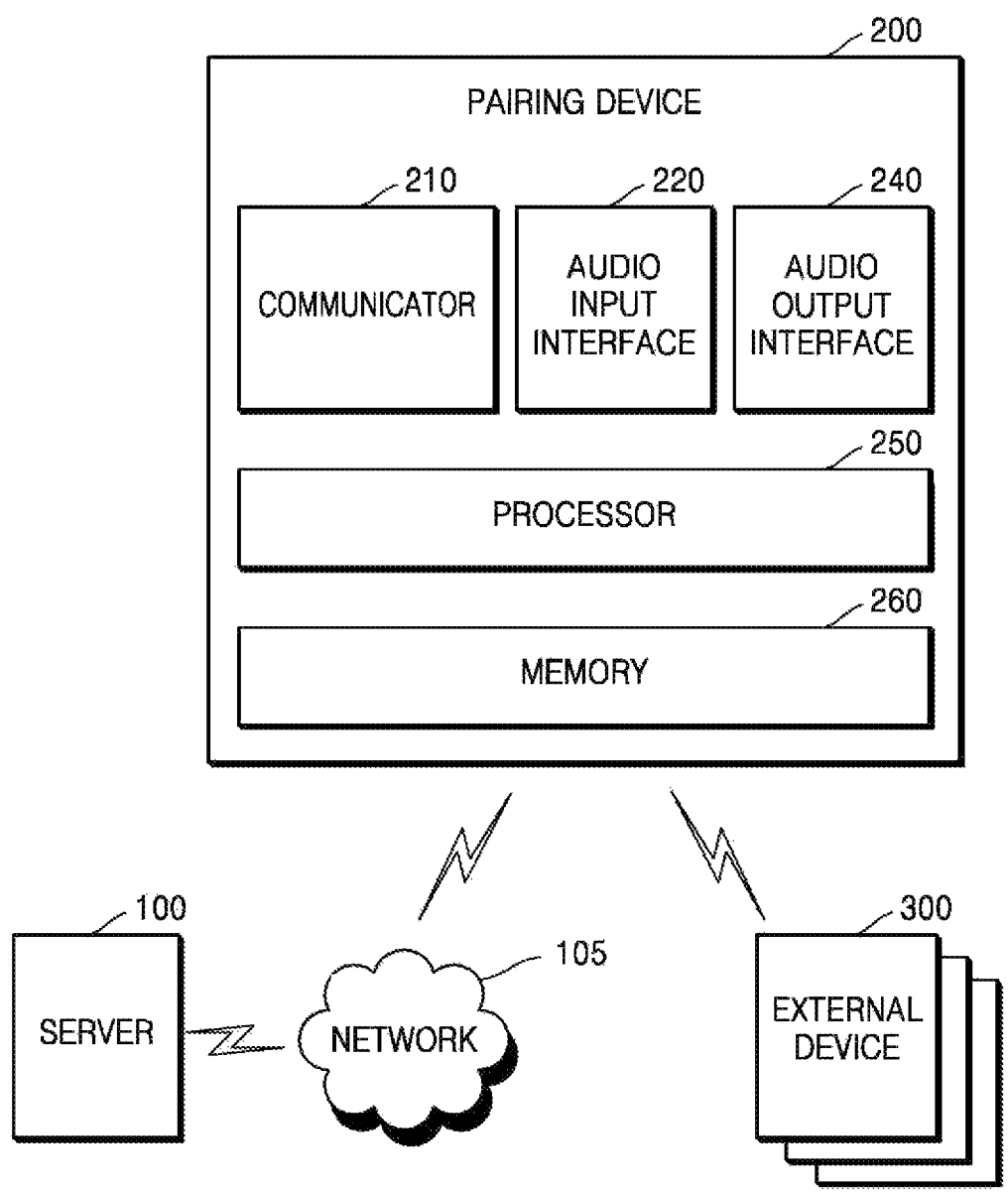
FIG. 4 is a view illustrating a structure of a pairing device which is capable of operating in connection with a server, according to an exemplary embodiment.

FIG. 4 is a block diagram illustrating a pairing device according to an exemplary embodiment.

Referring to FIG. 4, the pairing device 200 according to an exemplary embodiment may include a communicator 210, an audio input interface 220, an audio output interface 240, a processor 250, and a memory 260.

The pairing device 200 may be connected to the server 100 via the network 105 through the communicator 210. Also, the pairing device 200 may be paired to the external device(s) 300 via the communicator 210. The pairing device 200 may be simultaneously or at substantially same time paired to a plurality of external devices 300.

The communicator 210 may include, for example, a Bluetooth communicator, a near-field communicator, a WLAN (WiFi) communicator, a ZigBee communicator, an infrared data association (IrDA) communicator, a WiFi direct (WFD) communicator, an ultra wideband (UWB) communicator, an Ant+ communicator, a mobile communicator, a broadcasting communicator, or the like, but is not limited thereto.

The audio input interface 220 may receive an external sound signal and process the sound signal as electric sound data. For example, the audio input interface 220 may receive a user's utterance for controlling the external device(s) 300, Also, when the external device(s) 300 is initially pared to the pairing device 200, the audio input interface 220 may receive a user's utterance for inputting a call sign of the external device 300. The audio input interface 220 may use various noise-removal algorithms in order to remove noises generated in the process of receiving the external sound signal.

The audio output interface 240 may output audio data received from the communicator 210 or stored in the memory 260. For example, the audio output interface 240 may output, via sound, a natural language corresponding to the command for controlling the external device(s) 300, the command being received from the server 100. Also, the audio output interface 240 may output a sound signal related to functions (for example, command execution, notification sounds, etc.) executed by the pairing device 200. The audio output interface 240 may include a speaker, a buzzer, or the like.

The processor 250 according to an exemplary embodiment may execute one or more programs stored to the memory 260.

The memory 260 according to an exemplary embodiment may store various data, programs, and applications for driving and controlling the pairing device 200.

For example, the memory 260 may store an application for managing the information of the external device(s) 300. Also, the memory 260 may store an application for pairing the pairing device 200 to the external device(s) 300 via near-field communication. According to an exemplary embodiment, the near-field communication may include, for example, Zigbee communication or Bluetooth communication.

Also, when the external device 300 is initially paired to the pairing device 200, the memory 260 may store the information of the external device(s) 300. The information of an external device 300 may include, for example, an ID of the external device 300, an ID of a manufacturer of the external device 300, and at least one call sign of the external device 300.

Figure 5:
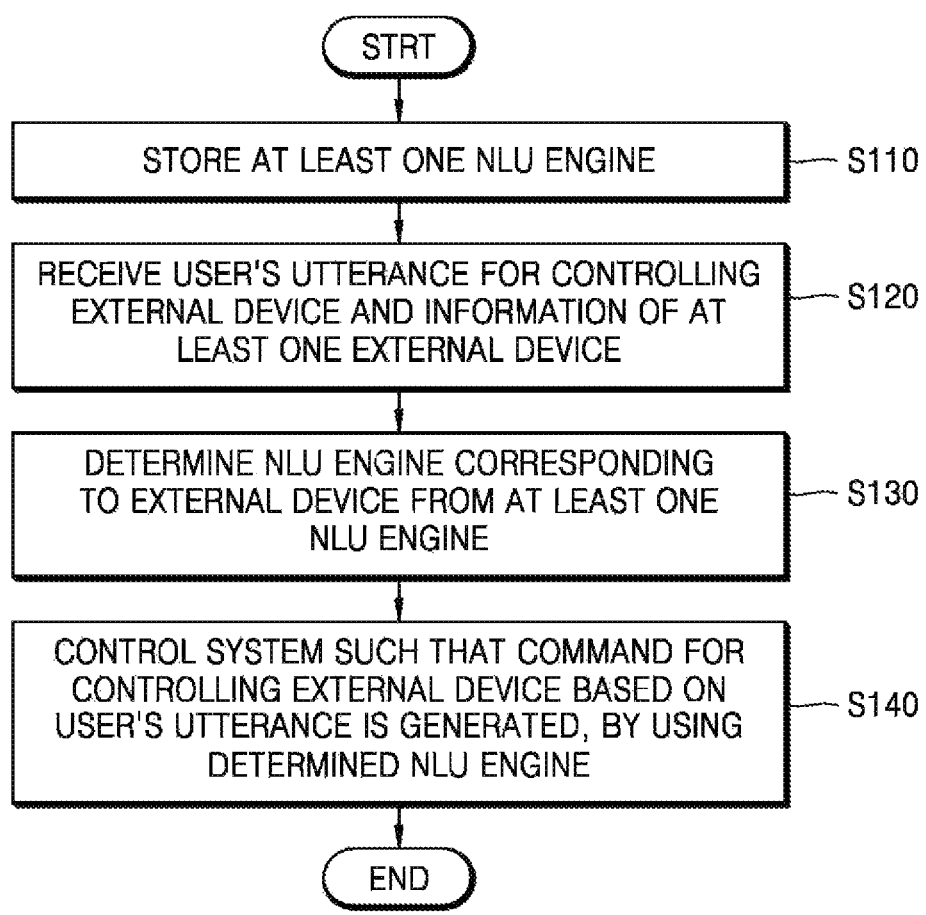
FIG. 5 is a flowchart illustrating a method of controlling an external device, according to an exemplary embodiment.

The ID of the external device 300 and the ID of the manufacturer of the external device 300 may be received from the external device 300 via the application for managing the external device 300 or input by a user. The call sign of the external device 300 may be received from the user via the audio input interface 220 of the pairing device 200. One external device 300 may include a plurality of call signs, FIG. 5 is a flowchart illustrating a method of controlling an external device, according to an exemplary embodiment.

In operation S110, the server 100 may store at least one NLU engine. Here, the at least one NLU engine may generate a command corresponding to a users utterance.

According to an exemplary embodiment, the server 100 may receive at least one NLU engine corresponding to each external device from a manufacturer of the external device. The at least one NLU engine may be later updated by the manufacturer of the respective external device.

The server 100 may receive a corpus including text for controlling the external device. The corpus may include a set of sentences corresponding to the portion of the phrase of the service call of the external device for controlling the external device. The portion of the phrase of the service call of the external device corresponding to the sentences included in the corpus may be analyzed by using the NLU engine.

The server 100 may train, via an NLU training module, the NLU engine such that the portion of the phrase of the service call of the external device may be analyzed by using the NLU engine, when the portion of the phrase of the service call of the external device has the same meaning as the sentences included in the corpus, while differing from the sentences included in the corpus.

For example, the corpus may include a command for controlling the external device and at least one sentence corresponding to the command, in a corresponding relationship.

When the external device is, for example, a bulb, the server 100 may store the NLU engine including a corpus as shown in [Table 1].

TABLE 1

| Command | Sentence |
|---|---|
| light_on | turn on |
| light_off | turn off |
| dim_up | increase the brightness by {1\|amount} |
| dim_up | increase the brightness a little more |
| dim_down | decrease the brightness by {1\|amount} |
| do_Ssayki | tell it to glitter |
| do_Ssayki | tell it to glitter by level {3\|amount} |
| stop_Ssayki | stop glittering |
| change_color | tell it to glitter in {red\|color} |
| change_color | tell it to be turned to {yellow\|color} |

In operation S120, the server 100 may receive a user's utterance for controlling the external device and information of at least one external device.

For example, the server 100 may receive the user's utterance, "tell a bulb in the living room to glitter in red," from a pairing device paired to the external device.

Also, the server 100 may receive, from the pairing device, the information of at least one external device registered and paired with the pairing device.

In operation S130, the server 100 may determine an NLU engine corresponding to the external device from the at least one NLU engine.

According to an exemplary embodiment, the server 100 may determine the NLU engine corresponding to the external device based on the users utterance for controlling the external device and the information of at least one external device.

For example, the server 100 may determine the NLU engine based on the user's utterance, "tell a bulb in the living room to glitter in red," and the information of at least one external device corresponding to the call sign, "bulb in the living room."

In operation S140, the server 100 may control the external device such that the command for controlling the external device based on the user's utterance is generated, by using the determined NLU engine.

Referring to [Table 1], according to an exemplary embodiment, the corpus included in the determined NLU engine may include the sentence "tell it to glitter in {red\|color}" corresponding to the command "change_color."

For example, when the server 100 receives the user's utterance including the sentence "tell it to glitter in {red\|color}," the server 100 may generate an NLU result by using the NLU engine. Thereafter, the server 100 may control the external device such that the command "change_color" is generated based on the NLU result.

According to an exemplary embodiment, the server 100 may receive the user's utterance and generate the NLU result by using the NLU engine. Then, the server 100 may generate the command corresponding to the NLU result, by using an external server.

Figure 6:
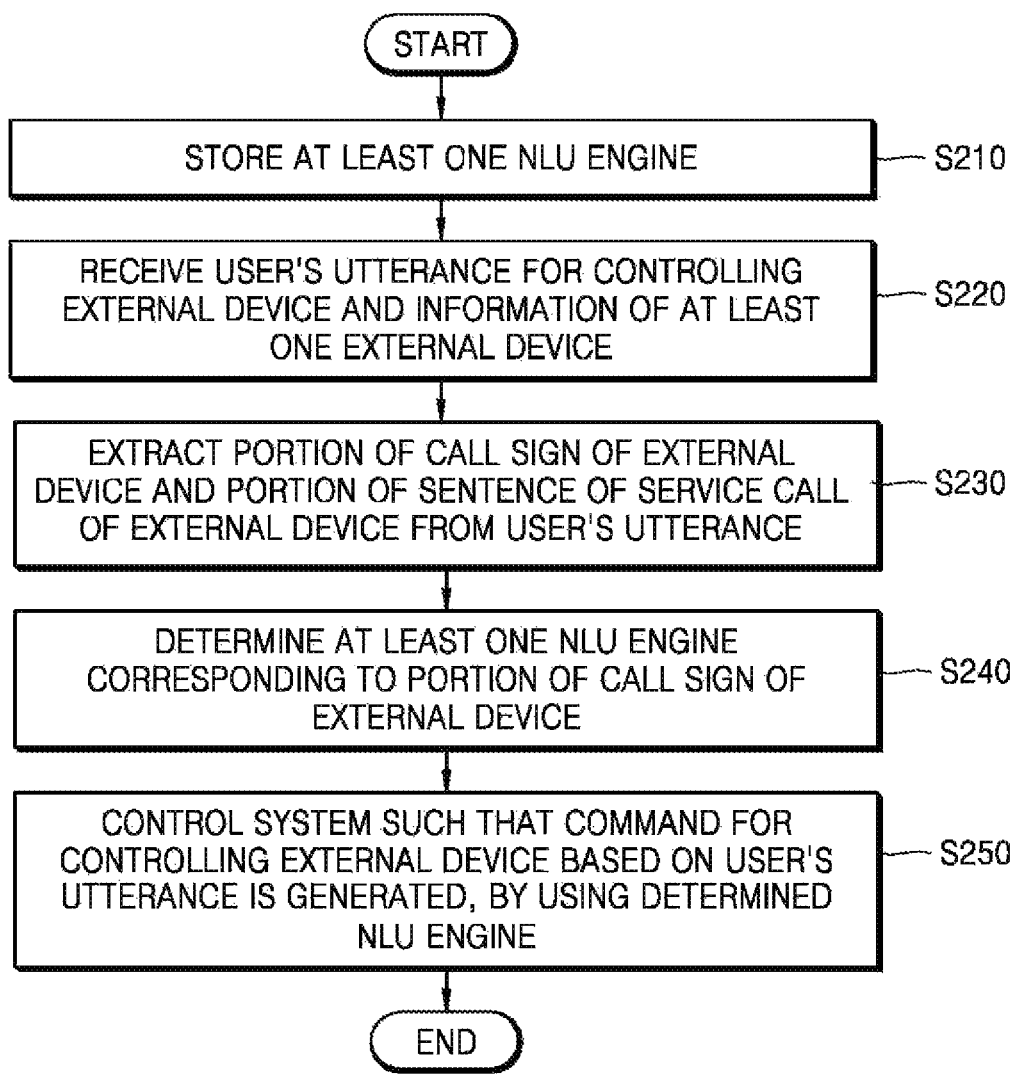
FIG. 6 is a flowchart illustrating a method of controlling an external device, according to an exemplary embodiment.

FIG. 6 is a flowchart illustrating a method of controlling an external device, according to an exemplary embodiment.

In operation S210, the server 100 may store at least one NLU engine. Operation S210 may correspond to operation S110 described with reference to FIG. 5, according to an exemplary embodiment.

In operation S220, the server 100 may receive a user's utterance for controlling the external device and information of at least one external device. Operation S220 may correspond to operation S120 described with reference to FIG. 5, according to an exemplary embodiment.

In operation S230, the server 100 may extract a portion of a call sign of the external device and a phrase of a service call of the external device from the users utterance.

For example, from the user's utterance "tell a bulb to glitter," the server 100 may extract the portion of the call sign of the external device "bulb" and the portion of the phrase of the service call of the external device "tell [ . . . ] to glitter."

In operation S240, the server 100 may determine at least one NLU engine corresponding to the portion of the call sign of the external device.

According to an exemplary embodiment, the server 100 may determine the at least one NLU engine corresponding to the portion of the call sign of the external device, based on the portion of the call sign of the external device and the information of at least one external device.

For example, the server 100 may determine the at least one NLU engine based on the portion of the call sign of the external device "bulb" and the information of at least one external device corresponding to the call sign "bulb."

In detail, according to an exemplary embodiment, the external device having the call sign "bulb" included in the information of at least one external device may include a bulb in a living room, a bulb in a main room, or a bulb in a kitchen. The server 100 may determine the at least one NLU engine corresponding to the bulb in the living room, the bulb in the main room, or the bulb in the kitchen based on the portion of the call sign of the external device "bulb" and the information of at least one external device.

In operation S250, the server 100 may control the external device such that a command for controlling the external device based on the user's utterance is generated by using the determined NLU engine.

Operation S250 includes operation S140 of FIG. 5, according to an exemplary embodiment. When the determined NLU engine includes a plurality of NLU engines, the server 100 may control the external device such that a plurality of commands for controlling the external device based on the user's utterance are generated by using the plurality of determined NLU engines.

Figure 7:
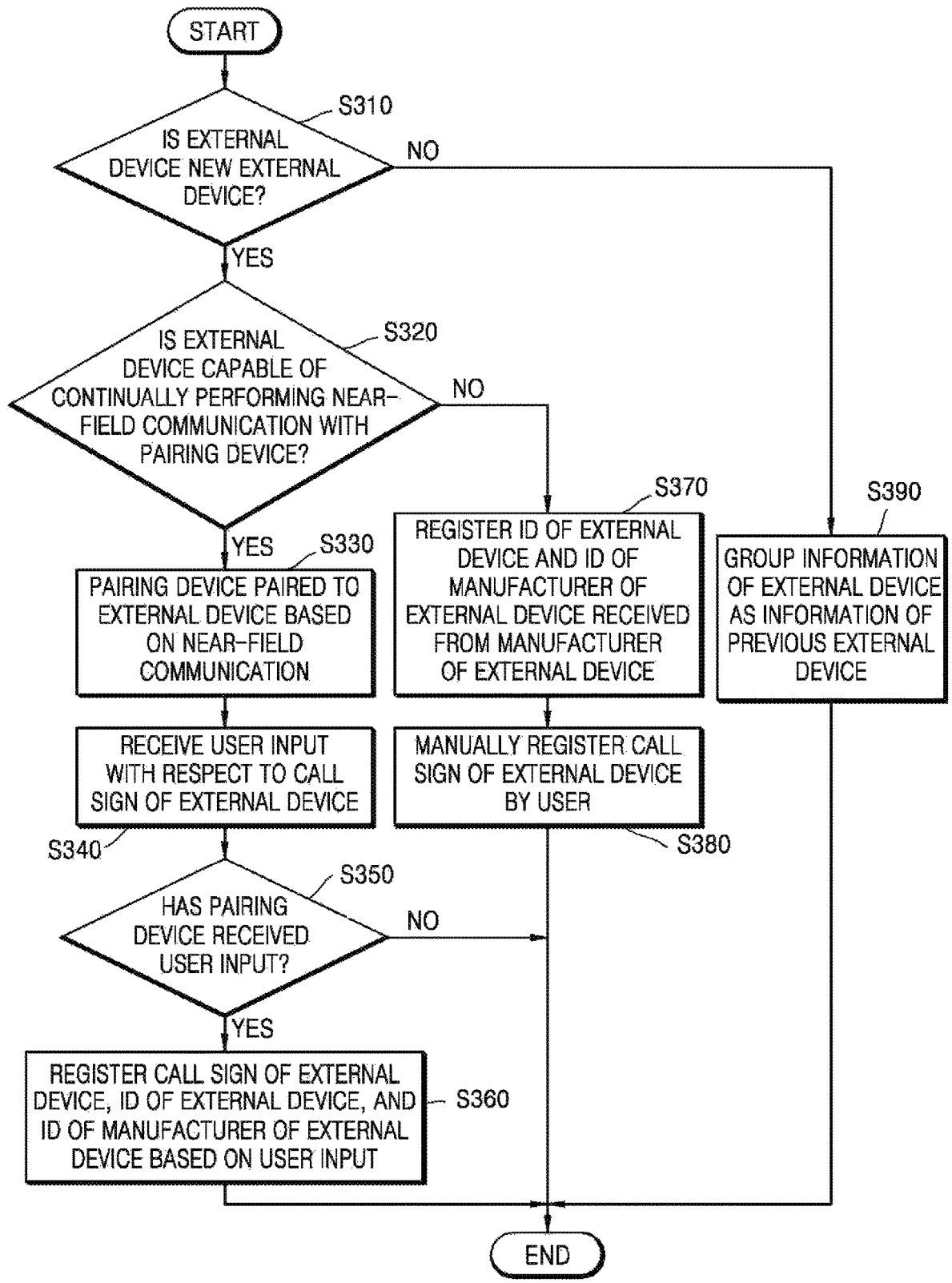
FIG. 7 is a flowchart illustrating a method of registering an external device to a pairing device, according to an exemplary embodiment.

FIG. 7 is a flowchart illustrating a method of registering an external device with a pairing device, according to an exemplary embodiment.

The server 100 according to an exemplary embodiment may control the external device such that a command for controlling the external device is generated by using an NLU engine determined based on a user's utterance for controlling the external device and information of at least one external device. The information of at least one external device may be stored in the pairing device 200.

The information of at least one external device according to an exemplary embodiment may be pre-stored in the pairing device 200 according to operations illustrated in FIG. 7.

In operation S310, the pairing device 200 may determine whether the external device to be paired to the pairing device 200 is a new external device.

The pairing device 200 according to an exemplary embodiment may store information of the external device which is to be paired to the pairing device 200, The pairing device 200 may determine whether the pairing device 200 pre-stores the information of the external device which is to be paired to the pairing device 200.

When, in operation S310, the external device to be paired to the pairing device 200 is a new external device, the pairing device 200 may determine whether the external device to be paired to the pairing device 200 is capable of continually performing near-field communication with the pairing device 200, in operation S320. The near-field communication that the external device continually performs with the pairing device 200 may include WLAN (WiFi) communication, ZigBee communication, Bluetooth communication, or the like.

When the external device to be paired to the pairing device 200 is capable of continually performing near-field communication with the pairing device 200 in operation S320, the pairing device 200 may be paired to the external device based on near-field communication, in operation S330.

In operation S340, the pairing device 200 may receive a user input with respect to a call sign of the external device.

The pairing device 200 according to an exemplary embodiment may receive a user's utterance including the call sign for calling the external device. For example, the pairing device 200 may output a message for asking a user to input a call sign, via an audio output interface, and receive a user's utterance including the call sign, via an audio input interface.

Also, the pairing device 200 may receive, from the user, other forms of input, such as text, which include the call sign.

The pairing device 200 may determine whether the pairing device 200 has received the user input, in operation S350.

When the pairing device 200 has received the user input, the pairing device 200 may register the call sign of the external device, an ID of the external device, and an ID of a manufacturer of the external device based on the user input, in operation S360. When the pairing device 200 has not received the user input, the method of registering the external device to the pairing device 200 may be ended.

According to an exemplary embodiment, the ID of the external device may be given by the pairing device 200. Also, the ID of the manufacturer may be received from the external device when the pairing device 200 is paired to the external device.

When the external device to be paired to the pairing device 200 is not capable of continually performing near-field communication with the pairing device 200, in operation S320, the pairing device 200 may register the ID of the external device and the ID of the manufacturer of the external device received from the manufacturer, in operation S370.

The external device to be paired to the pairing device 200 may not be capable of continually performing near-field communication with the pairing device 200, when the external device is located outside a range in which the external device is capable of continually performing near-field communication, or when the external device operates outside the range in which the external device is capable of continually performing near-field communication. For example, when the external device is an automobile or a car, it may be determined that the external device is not capable of continually performing near-field communication with the pairing device 200.

The user may manually register the call sign of the external device to the pairing device, in operation S380.

When the external device to be paired to the pairing device 200 is not determined as a new external device, in operation S310, the pairing device 200 may group information of the external device as information of a previous external device, in operation S390.

Figure 8:
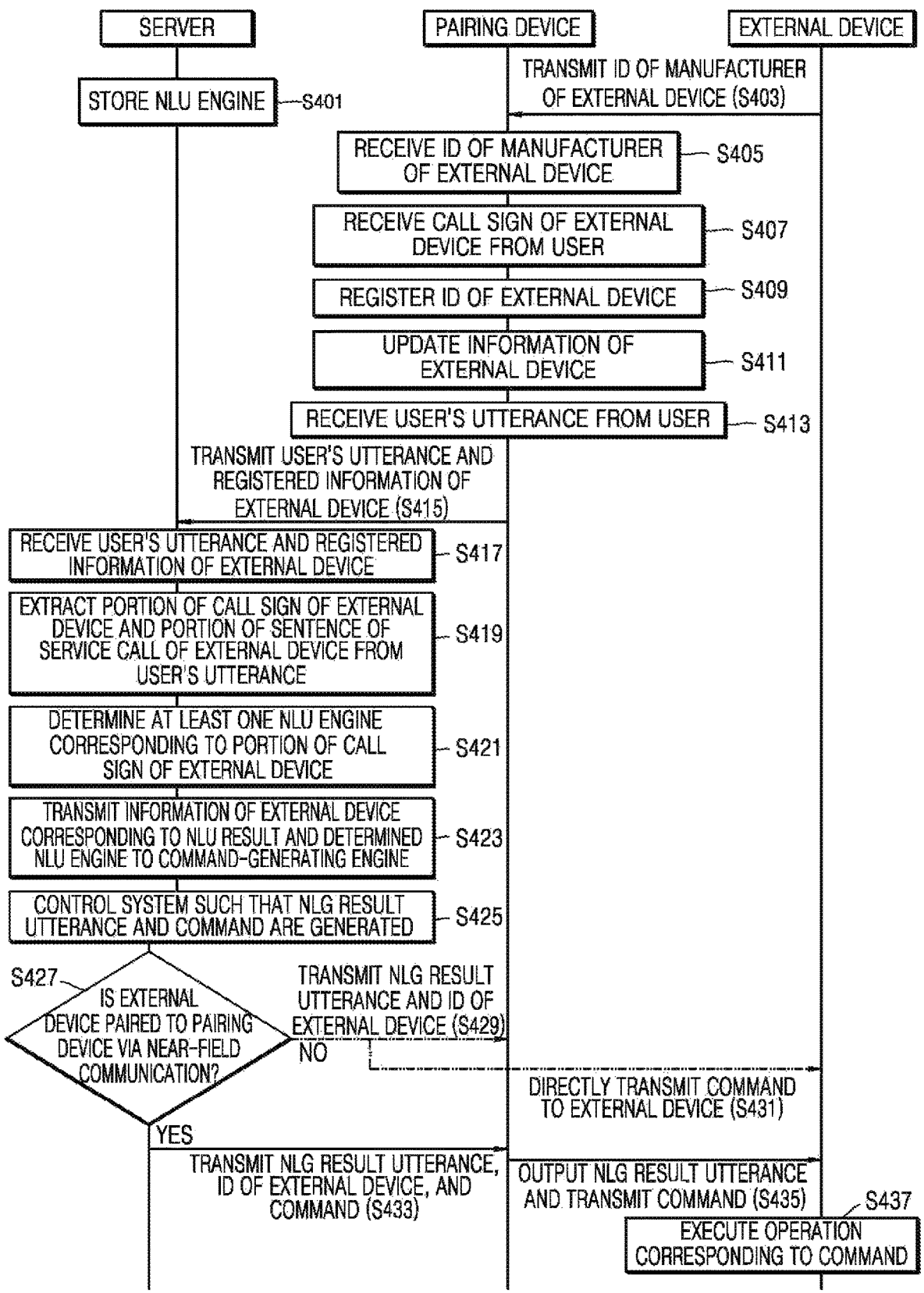
FIG. 8 is a flowchart illustrating a method of controlling an external device based on a users utterance in a system for controlling the external device, according to an exemplary embodiment.

FIG. 8 is a flowchart illustrating a method of controlling the external device 300 based on a user's utterance in a system for controlling the external device 300, according to an exemplary embodiment.

In operation S401, the server 100 may store an NLU engine.

In operation S403, the external device 300 may transmit an ID of a manufacturer of the external device 300 to the pairing device 200.

In operation S405, the pairing device 200 may receive the ID of the manufacturer of the external device 300 from the external device 300.

In operation S407, the pairing device 200 may receive a call sign of the external device 300 from a user. The pairing device 200 according to an exemplary embodiment may receive a user's utterance including the call sign from the user.

In operation S409, the pairing device 200 may register an ID of the external device 300. The pairing device 200 may give each external device its own ID.

In operation S411, the pairing device 200 may update information of the external device 300. The pairing device 200 may update the information of the external device 300, which includes the ID of the manufacturer of the external device 300, the call sign of the external device 300, and the ID of the external device 300. According to an exemplary embodiment, the pairing device 200 may add information of a new external device to the information of the previously registered external device 300.

In operation S413, the pairing device 200 may receive a user's utterance from the user.

In operation S415, the pairing device 200 may transmit the users utterance and the registered information of the external device 300 to the server 100.

In operation S417, the server 100 may receive the user's utterance and the registered information of the external device 300 from the pairing device 200.

In operation S419, the server 100 may extract a portion of the call sign of the external device 300 and a portion of an operation of the external device 300 from the user's utterance.

In operation S421, the server 100 may determine at least one NLU engine corresponding to the portion of the call sign of the external device 300.

In operation S423, the server 100 may transmit the information of the external device 300 corresponding to the determined NLU engine and an NLU result to a command-generating engine. Here, the NLU result may be analyzed by using the at least one NLU engine corresponding to the portion of the call sign of the external device 300. The command-generating engine may be stored to the server 100 or to another server outside the server 100.

In operation S425, the server 100 may control the external device such that a natural language-generating (NLG) result utterance and a command are generated. According to an exemplary embodiment, the server 100 may control the external device such that the command-generating engine, stored in the server 100 or in another server outside or external to the server, generates the command for controlling the external device 300.

In operation S427, the server 100 may determine whether the external device 300 is paired to the pairing device 200 via near-field communication.

When the external device 300 is not paired to the pairing device 200 via near-field communication, in operation S427, the server 100 may transmit the NLG result utterance and the ID of the external device 300 to the pairing device 200, in operation S429.

When the external device 300 is not paired to the pairing device 200 via near-field communication, in operation S427, the server 100 may directly transmit the command to the external device 300, in operation S31.

When the external device 300 is paired to the pairing device 200 via near-field communication, in operation S427, the server 100 may transmit the NLG result utterance, the ID of the external device 300, and the command to the pairing device 200, in operation S433.

In operation S435, the pairing device 200 may output the NLG result utterance and transmit the command to the external device 300.

In operation S437, the external device 300 may perform an operation corresponding to the received command.

Figure 9A:
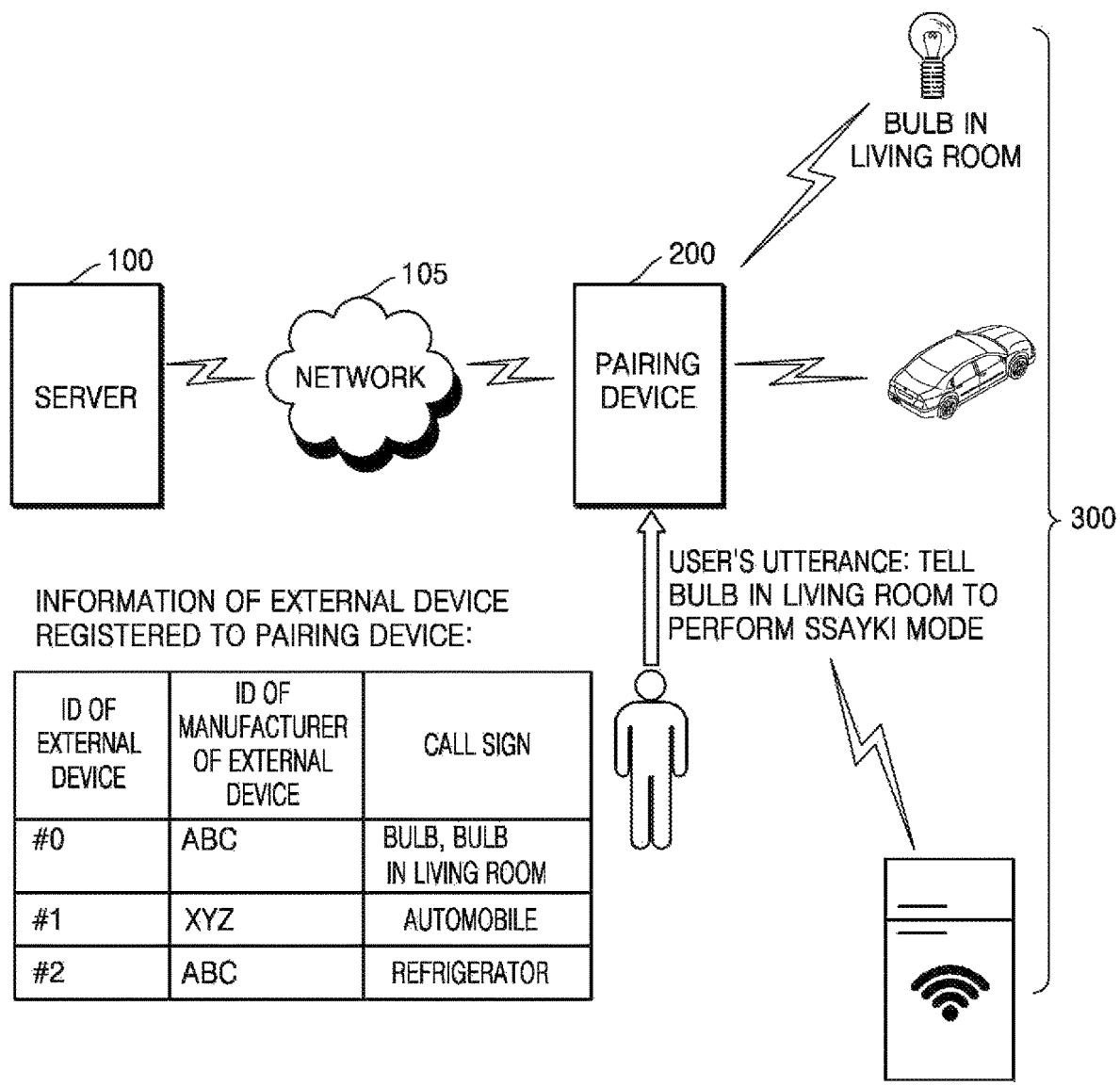
FIG. 9A is a view illustrating an operation in which a user's utterance is received in a system for controlling an external device, according to an exemplary embodiment.

FIG. 9A is a view illustrating an operation in which a user's utterance is received in a system for controlling the external device, according to an exemplary embodiment.

Referring to FIG. 9A, the pairing device 200 paired with the external device(s) 300 may receive the user's utterance, "tell a bulb in the living room to perform a Ssayki mode," The external devices 300 may include a refrigerator, a car, and a light bulb in the living room.

The pairing device 200 may store information of the external device(s) 300, which includes, for each respective external device, an ID of the external device 300, an ID of a manufacturer of the external device 300, and a call sign of the external device 300.

Figure 9B:
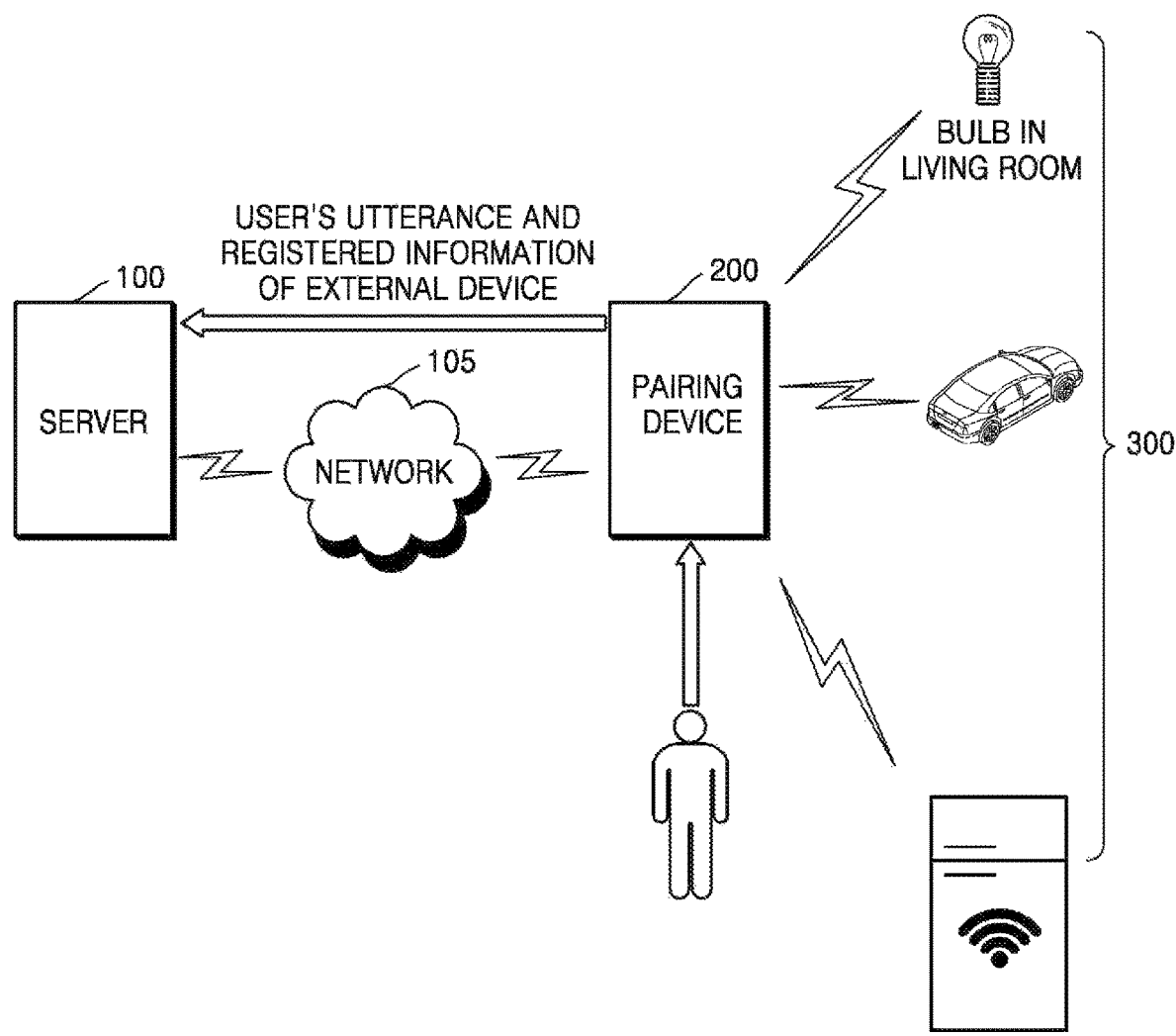
FIG. 9B is a view illustrating an operation in which a users utterance and registered information of an external device are transmitted from a pairing device to a server in a system for controlling an external device, according to an exemplary embodiment.

FIG. 9B is a view illustrating an operation in which the pairing device 200 transmits the user's utterance and the registered information of the external device to the server in a system for controlling the external device, according to an exemplary embodiment.

The pairing device 200 may transmit to the server 100 the received user's utterance and all or at least a portion of the information of the external device 300 stored to the pairing device 200.

Figure 9C:
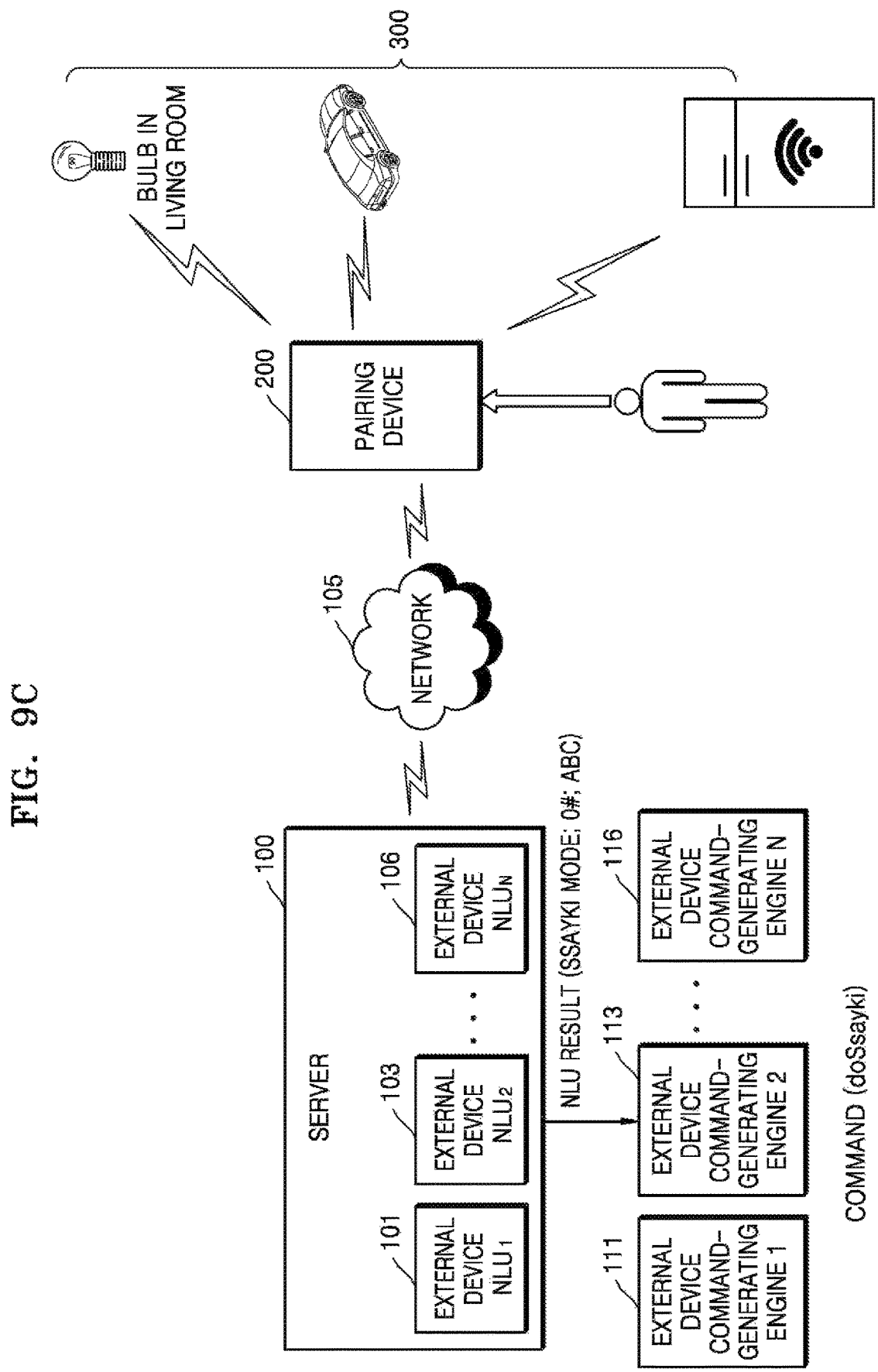
FIG. 9C is a view illustrating an operation in which a command for controlling an external device is generated by using a natural language understanding (NLU) engine and a command generating engine in a system for controlling the external device, according to an exemplary embodiment.

FIG. 9C is a view illustrating an operation in which a command for controlling an external device is generated by using an NLU engine and a command-generating engine in a system for controlling the external device, according to an exemplary embodiment.

The server 100 according to an exemplary embodiment may extract a portion of a call sign of the external device 300 and a portion of a phrase of a service call of the external device 300 from the user's utterance.

For example, the server 100 may extract, from the user's utterance, "tell a bulb in the living room to perform a Ssayki mode," the portion of the call sign, "bulb in the living room" and the portion of the phrase of the service call of the external device 300, "tell [ . . . ] to perform a Ssayki mode."

Here, an NLU result may be generated by analyzing a natural language by using at least one NLU engine corresponding to the portion of the call sign of the external device 300, "bulb in the living room."

Referring to FIG. 9C, the server 100 may store a first NLU engine 101, a second NLU engine 103, ..., and an N$^{th}$ NLU engine 106. Also, a first command-generating engine 111, a second command-generating engine 113, and an N$^{th}$ command-generating engine 116 may be stored in the server 100 or another server outside of the server 100 or external to the server 100.

The server 100 may determine the second NLU engine 103 corresponding to the "bulb in the living room" based on the user's utterance and information of at least one external device.

Also, the server 100 may generate the NLU result of the user's utterance, "tell a bulb in the living room to perform a Ssayki mode," by using the second NLU engine 103. Referring to FIG. 9C, the NLU result may include service content (Ssayki mode), the ID of the external device 300 (0#), and the ID of the manufacturer of the external device 300 (ABC).

The server 100 may control the external device such that the command for controlling the external device 300 based on the user's utterance is generated by using the command-generating engine 113 corresponding to the second NLU engine 103. For example, the server 100 may generate a command (doSSsayki) based on the NLU result (Ssayki mode; 0#; and ABC).

Figure 9D:
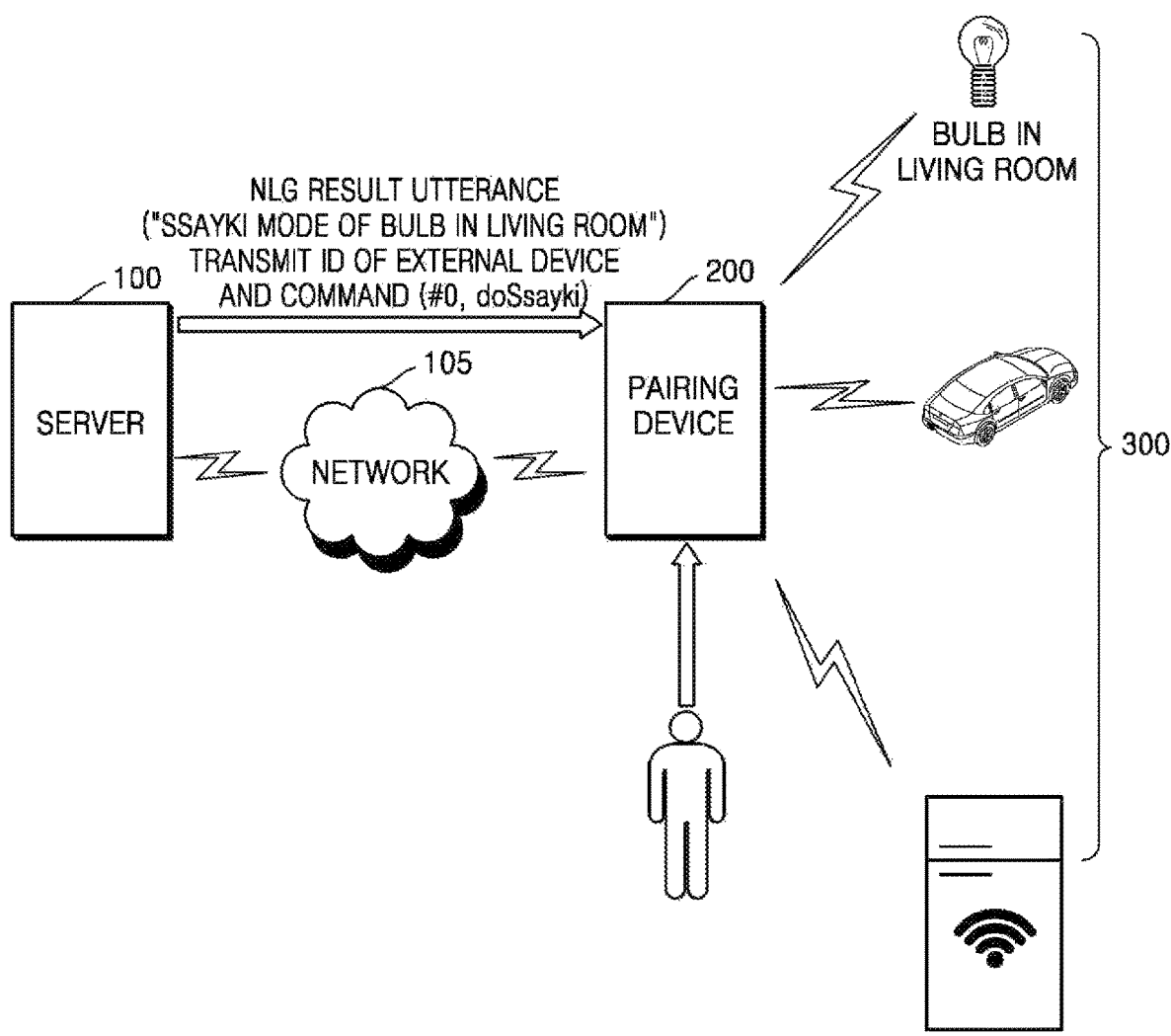
FIG. 9D is a view illustrating an operation in which a natural language generation (NLG) result, an identification (ID) of an external device, and a command are transmitted from a server to a pairing device in a system for controlling the external device, according to an exemplary embodiment.

FIG. 9D is a view illustrating an operation in which the server 100 transmits an NLG result utterance, the ID of the external device, and the command to the pairing device in a system for controlling the external device, according to an exemplary embodiment.

Referring to FIG. 9D, the server 100 may transmit the NLG result utterance ("Ssayki mode of the bulb in the living room") to the pairing device 200. The pairing device 200 may output the received NGL result utterance.

Referring to FIG. 9D, the server 100 may transmit the ID of the external device 300 and the command (#0, doSsayki) to the pairing device 200.

Figure 9E:
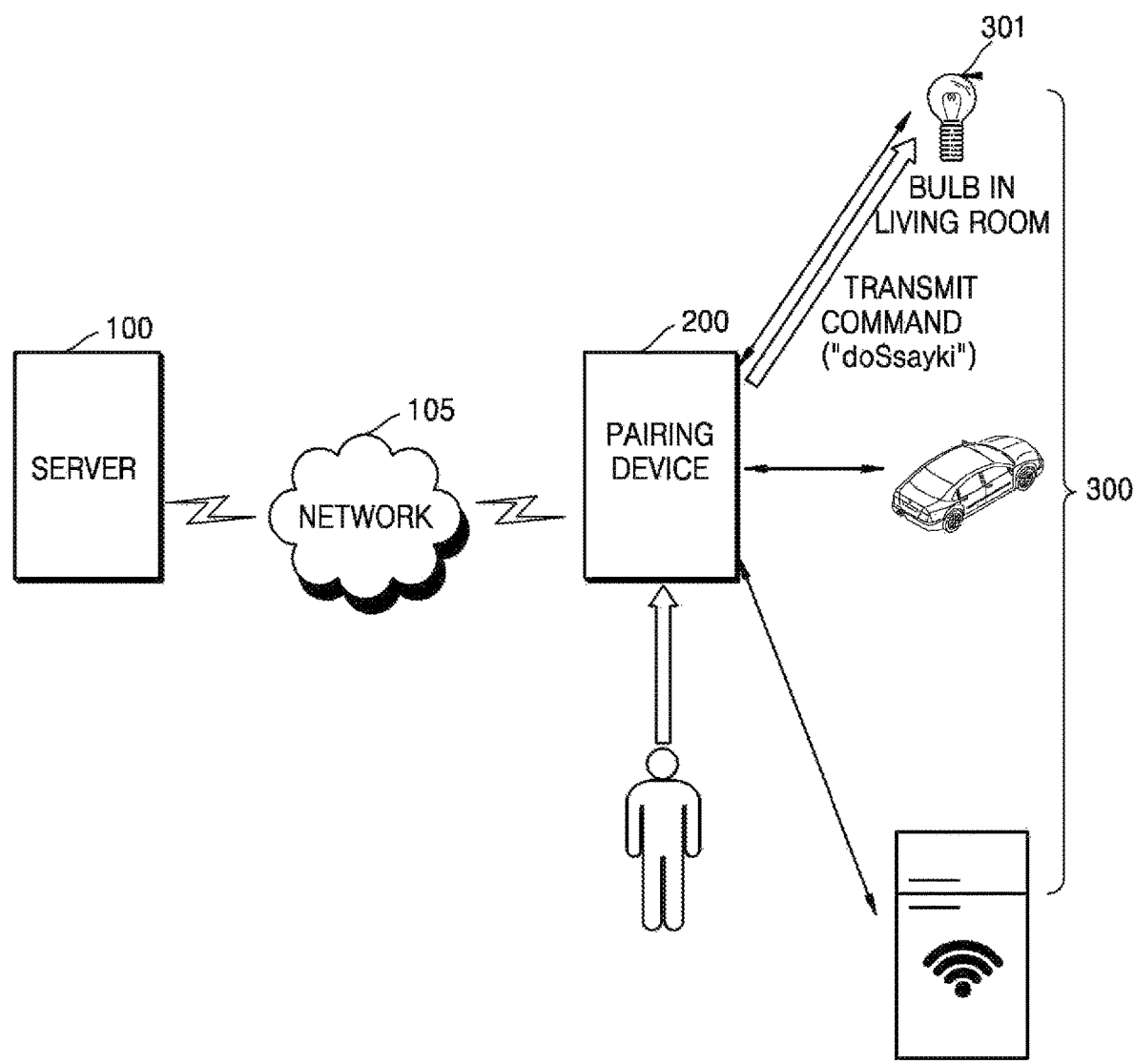
FIG. 9E is a view illustrating an operation in which a command is transmitted from a pairing device to an external device in a system for controlling the external device, according to an exemplary embodiment.

FIG. 9E is a view illustrating an operation in which the pairing device transmits the command to the external device in a system for controlling the external device, according to an exemplary embodiment.

For example, the pairing device 200 may transmit the command (doSsayki) to a bulb in the living room 301 corresponding to #0, which is the ID of the external device 300, based on the ID of the external device 300 and the command (#0, doSsayki) received from the server 100.

Figure 10:
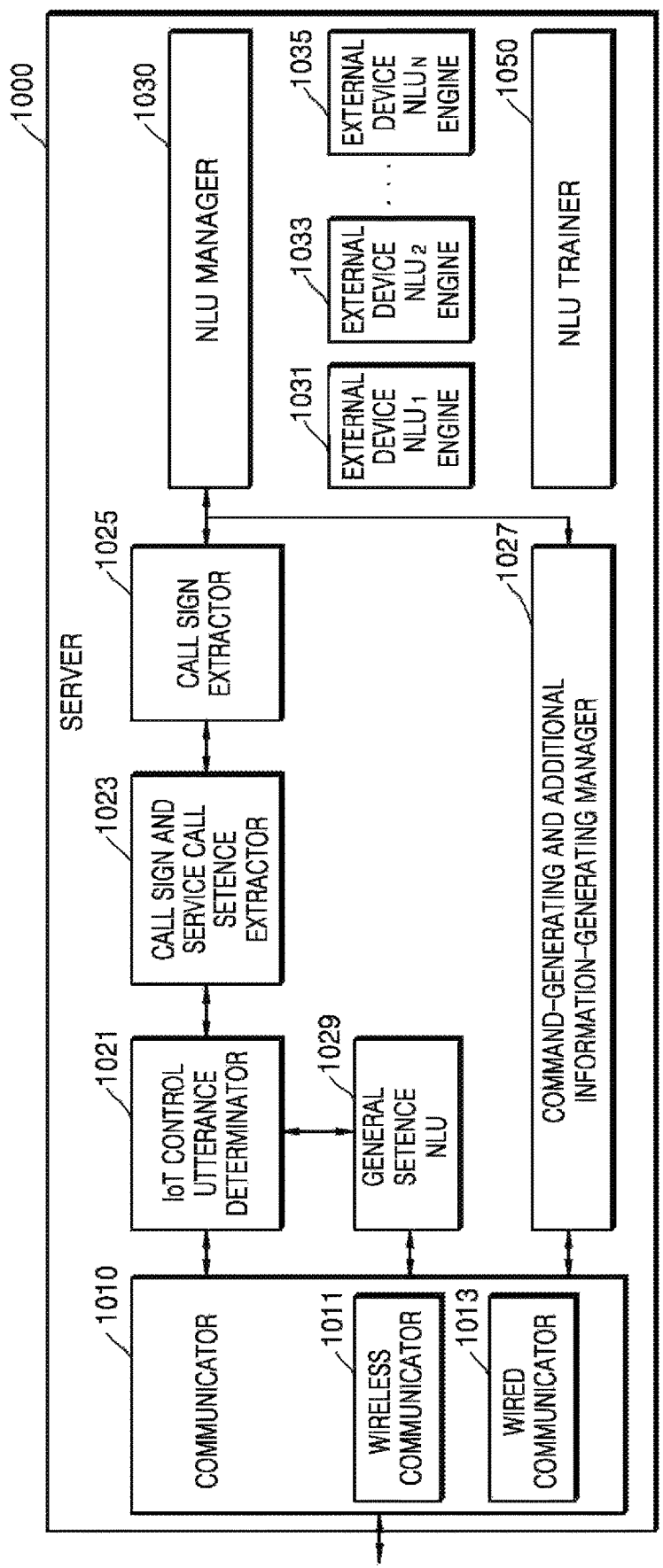
FIG. 10 is a block diagram illustrating a detailed structure of a server, according to an exemplary embodiment.

FIG. 10 is a block diagram illustrating a detailed structure of a server according to an exemplary embodiment.

The server 1000 may include a communicator 1010 including a wireless communicator 1011 and a wired communicator 1013.

The communicator 1010 may transmit and receive data to and from a pairing device via wireless communication and/or wired communication.

Also, the server 1000 may include an IoT control utterance determinator 1021, a call sign and service call sentence extractor 1023, a call sign interpreter 1025, a command-generating and additional information-generating manager 1027, and a general sentence NLU 1029.

The server 1000 may determine whether a user's utterance is for controlling the external device, via the IoT control utterance determinator. When the user's utterance is not for controlling the external device, the user's utterance may be analyzed via the general sentence NLU 1029.

The command-generating and additional information-generating manager 1027 is configured to manage a command-generating engine and additional information of the external device. The command-generating and additional information-generating manager 1027 may be connected to an NLU manager 1030 to control the generation of a command based on an NLU result.

The server 1000 may further include the NLU manager 1030. Also, the server 1000 may store a first NLU engine 1031, a second NLU engine 1033, and an N$^{th}$ NLU engine 1035.

The NLU manager 1030 may manage the first NLU engine 1031, the second NLU engine 1033, ..., and the N$^{th}$ NLU engine 1035. Also, the NLU manager 1030 may control the external device such that at least one NLU engine is determined based on a call sign extracted from the user's utterance.

The server 1000 may include an NLU trainer 1050. The NLU trainer 1050 may update the NLU engine based on a corpus received from a manufacturer of the external device. The NLU trainer 1050 may control the NLU engine to analyze a sentence even if the sentence is not the same as a sentence included in the received corpus.

As described above, according to one or more exemplary embodiments, a manufacturer of an IoT device may not have to bear the burden to operate an additional server to provide a function of controlling the IoT device.

Also, different manufacturers of IoT devices may register functions of controlling the IoT devices without restraint.

Furthermore, a device for controlling an IoT device may operate also as an additional IoT hub corresponding to the IoT device so that a user does not have to buy an additional IoT hub, and does not have to connect his/her IoT device to an electronic device via a website, etc., by himself/herself.

The control method according to exemplary embodiments may be implemented as computer instructions which may be executed by various computer means, and recorded on a non-transitory computer-readable recording medium. The non-transitory computer-readable recording medium may include program commands, data files, data structures, or a combination thereof. The program commands recorded on the non-transitory computer-readable recording medium may be specially designed and constructed for the present disclosure or may be known to and usable by one of ordinary skill in a field of computer software. Examples of the non-transitory computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level programming language that may be executed by a computer using an interpreter as well as a machine language code made by a complier.

Exemplary embodiments have been described with reference to accompanying drawings. However, one of ordinary skill in the art will easily achieve many modifications and changes without departing from the spirit and scope of the present disclosure. Therefore, it is to be understood that the foregoing are illustrative exemplary embodiments and are not to be construed as limited to the specific exemplary embodiments. Modifications to exemplary embodiments, as well as other exemplary embodiments, are intended to be included within the scope of the appended claims and their equivalents.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A pairing device for controlling an external device among external devices paired to the pairing device, the pairing device comprising:
an input interface configured to receive a user voice input;
a communicator; and
a processor configured to:
control the communicator to receive, via a first communication, a plurality of pieces of information on the external devices from the external devices, wherein the plurality of pieces of information include identifications (IDs) of the external devices, IDs of manufacturers of the external devices, and call signs of the external devices,
register the external devices based on the IDs of the external devices, the IDs of the manufacturers of the external devices, and the call signs of the external devices,
control the communicator to transmit, via a second communication, the IDs of the registered external devices, the IDs of the manufacturers of the registered external devices, and the call signs of the registered external devices to a server,
control to receive the user voice input for controlling the external device through the input interface, wherein the user voice input includes a call sign of the external device and a service call of the external device,
based on the user voice input being received through the input interface, control the communicator to transmit, via the second communication, the user voice input to the server,
control the communicator to receive, via the second communication, a result of natural language generation (NLG) corresponding to a result of natural language understanding (NLU), the ID of the external device and a command corresponding to the result of the NLU for controlling the external device from the server, the result of the NLU including a service content of the external device, the ID of the external device and ID of a manufacturer of the external device, and
control the communicator to transmit, via the first communication, the command to the external device based on the received ID of the external device,
wherein the received command is based on the user voice input and the IDs of the registered external devices, the IDs of the manufacturers of the registered external devices, and the call signs of the registered external devices transmitted from the pairing device to the server via the second communication.

2. The pairing device of claim 1, wherein the user voice input includes a phrase of the service call of the external device.

3. The pairing device of claim 1, wherein the command is provided using at least one natural language understanding (NLU) engine corresponding to the external device, from among the at least one NLU engine.

4. The pairing device of claim 1, wherein the call sign of the external device is identified based on at least one of a user input or the manufacturer of the external device.

5. The pairing device of claim 1, wherein the processor is configured to store the ID of the manufacturer of the external device, the ID of the external device, and the call sign of the external device.

6. The pairing device of claim 1, further comprising an input interface configured to receive a text input including the call sign of the external device.

7. The pairing device of claim 1, wherein the processor is configured to control the communicator to be simultaneously paired to a first external device and a second external device.

8. The pairing device of claim 1, wherein a function corresponding to the command is performed by the external device.

9. The pairing device of claim 1, wherein the processor is further configured to output the result of the NLG, the ID of the external device and the command corresponding to the user voice input.

10. An operating method of a pairing device for controlling an external device among external devices paired to the pairing device, the operating method comprising:
receiving, via a first communication, a plurality of pieces of information on the external devices from the external devices, wherein the plurality of pieces of information include identifications (IDs) of the external devices, IDs of manufacturers of the external devices, and call signs of the external devices;
registering the external devices based on the IDs of the external devices, the IDs of the manufacturers of the external devices, and the call signs of the external devices;
transmitting, via a second communication, the IDs of the registered external devices, the IDs of the manufacturers of the registered external devices, and the call signs of the registered external devices to a server;
receiving a user voice input for controlling the external device, wherein the user voice input includes a call sign of the external device and a service call of the external device;
based on the user voice input being received, transmitting, via the second communication, the user voice input to the server;
receiving, via the second communication, a result of natural language generation (NLG) corresponding to a result of natural language understanding (NLU), the ID of the external device and a command corresponding to the result of the NLU for controlling the external device from the server, the result of the NLU including a service content of the external device, the ID of the external device and ID of a manufacturer of the external device; and
transmitting, via the first communication, the command to the external device based on the ID of the external device,
wherein the received command is based on the user voice input and the IDs of the registered external devices, the IDs of the manufacturers of the external devices, and the call signs of the registered external devices transmitted from the pairing device to the server via the second communication.

11. The operating method of claim 10, wherein the user voice input includes a phrase of the service call of the external device.

12. The operating method of claim 10, wherein the command is provided using at least one natural language understanding (NLU) engine corresponding to the external device, from among the at least one NLU engine.

13. The operating method of claim 10, wherein the call sign of the external device is identified based on at least one of a user input or the manufacturer of the external device.

14. The operating method of claim 10, further comprising:
   storing the ID of a manufacturer of the external device, the ID of the external device, and the call sign of the external device.

15. The operating method of claim 10, further comprising:
   receiving a text input including the call sign of the external device.

16. The operating method of claim 10, wherein the pairing device is simultaneously paired to a first external device and a second external device.

17. The operating method of claim 10, wherein a function corresponding to the command is performed by the external device.

18. The pairing device of claim 10, further comprising outputting the result of the NLG, the ID of the external device and the command corresponding to the user voice input.

* * * * *